United States Patent [19]

Lee

[11] Patent Number: 4,787,476

[45] Date of Patent: Nov. 29, 1988

[54] TREE STAND

[76] Inventor: Richard D. Lee, 2110 Morningside Dr., Safety Harbor, Fla. 33572

[21] Appl. No.: 149,788

[22] Filed: Jan. 29, 1988

[51] Int. Cl.[4] .............................................. A45F 3/26
[52] U.S. Cl. .................................. 182/116; 182/187; 182/163
[58] Field of Search ................ 182/116, 187, 188, 83, 182/163, 100, 189, 107

[56] References Cited

U.S. PATENT DOCUMENTS

| 302,733 | 7/1884 | Jayne | 182/189 |
|---|---|---|---|
| 3,286,789 | 11/1966 | Planchon | 182/163 |
| 3,336,999 | 8/1967 | McSwain | 182/116 |
| 3,630,314 | 12/1971 | Bamburg | 182/116 |
| 3,703,939 | 11/1972 | Maxwell | 182/116 |
| 4,061,202 | 12/1977 | Campbell | 182/187 |
| 4,257,490 | 3/1981 | Bandy | 182/187 |
| 4,552,246 | 11/1985 | Thomas | 182/116 |
| 4,552,247 | 11/1985 | Purdy | 182/187 |

Primary Examiner—Reinaldo P. Machado
Attorney, Agent, or Firm—Herbert W. Larson

[57] ABSTRACT

A portable tree stand having an elongated tubular sectioned ladder. Each section of the ladder is pivotably attached to the adjacent section. The bottom ladder section is attached to a ground brace and the top ladder section to a platform. Movable cylindrical sleeves prevent movement of the ladder sections in the erected mode.

5 Claims, 4 Drawing Sheets

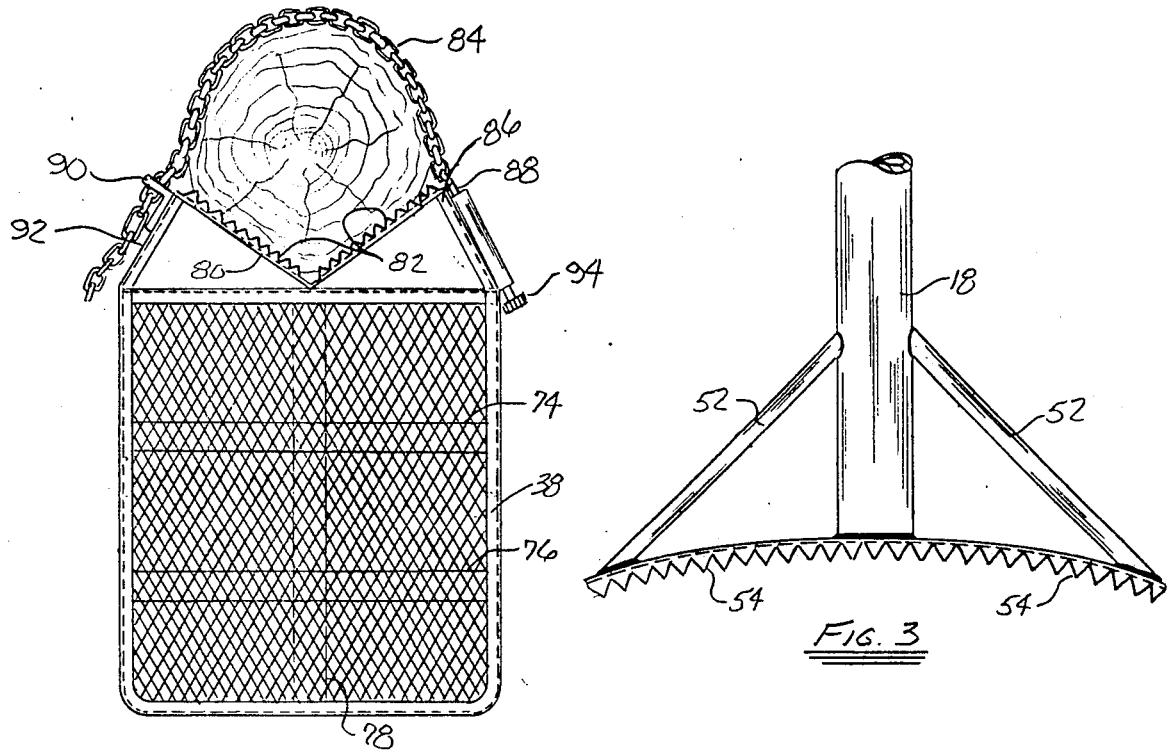
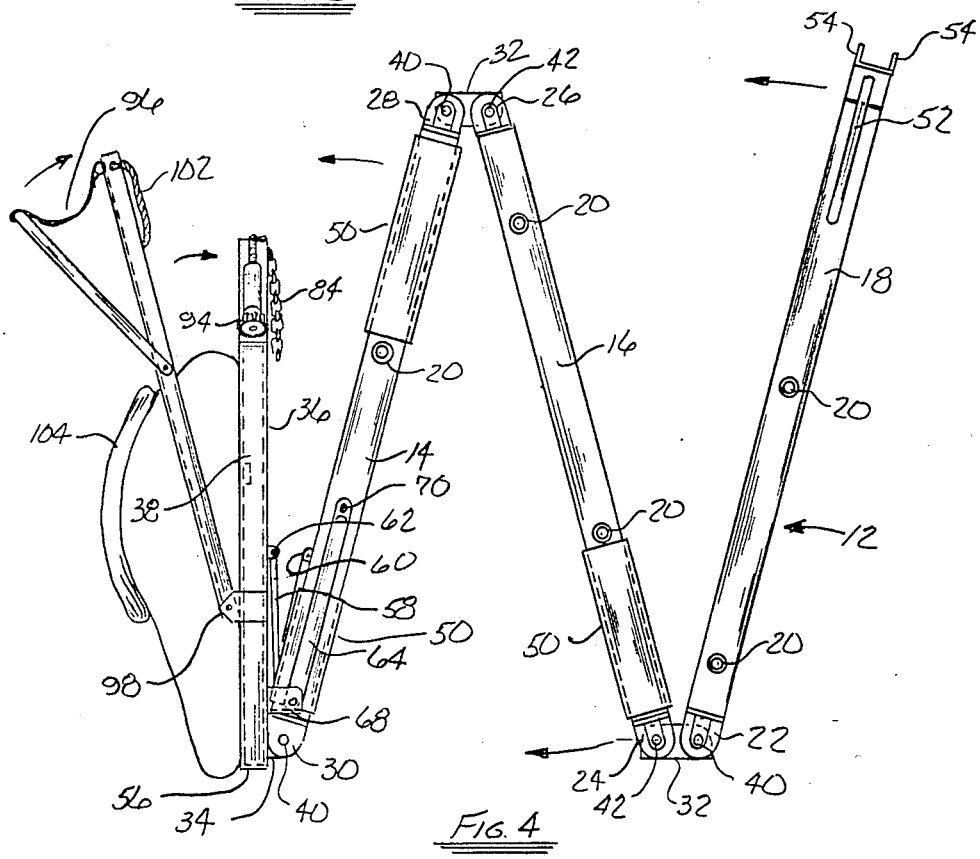

TREE STAND

BACKGROUND OF THE INVENTION

1. Field of the Invention

This invention relates to a device employed as a tree stand for hunters and wildlife photographers. More particularly, it refers to a tree stand, easily portable by a single individual and quickly mountable on a tree with slidable sleeve mounts frictionally fit over pivot points on a climbing pole and a platform pivotable attached to the top of the pole.

2. Description of the Prior Art

Tree stands of many varying designs have been used by hunters and wild life photographers for many years. Typical standard ladder design tree stands are shown in U.S. Pat. Nos. 3,703,939 and 4,552,247. These are bulky and difficult for one person to carry for long distances into a forest environment. Portable tree stands with a pole type climbing element are shown in U.S. Pat. Nos. 4,257,490 and 4,552,246. Although these latter portable stands can be carried by one individual, they lack compactness in the folded mode so that they can be carried noiselessly and conveniently. An improved convenient to carry and noiseless pack for a tree stand is needed.

SUMMARY OF THE INVENTION

I have invented a new fully portable tree stand that can be firmly attached to a tree and can safely support a single individual with a modicum of comfort while waiting for wildlife to appear. At the same time the tree stand is easily portable, lightweight and collapsible into a compact carrying package that is noiseless to carry.

My tree stand has an elongated ladder with multiple sections pivoting at an elbow joint so that adjacent sections are parallel to each other in the collapsed mode. The tree stand has a base member attached to the lowest ladder section and a platform with seat pivotally attached to the highest ladder section. The platform has a serrated edge proximal to the tree in the mounted mode and a locking nut to tighten a chain securing the platform to the tree. A frictionally fit sleeve secures each ladder section together and cantilevered hand hold steps are located in each ladder section.

BRIEF DESCRIPTION OF THE DRAWINGS

The invention may be best understood by those having ordinary skill in the art by reference to the following detailed description when considered in conjunction with the accompanying drawings in which:

FIG. 2 is a section view along 2—2 in FIG. 1.

FIG. 3 is a front elevation view of the base portion of the tree stand.

FIG. 4 is a side view of the tree stand partially collapsed.

DETAILED DESCRIPTION OF THE INVENTION

Figure 1:
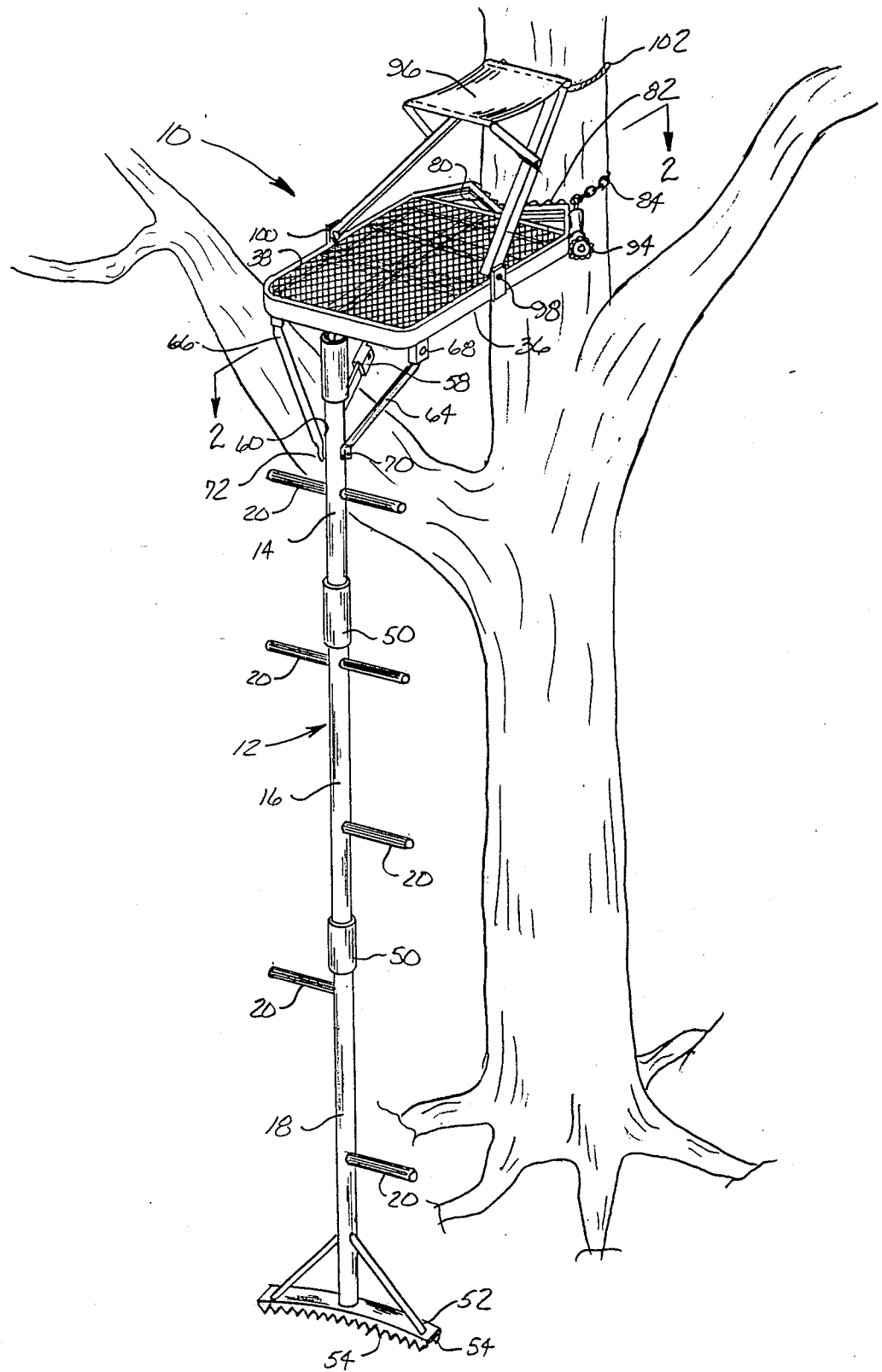
FIG. 1 is a perspective view of the tree stand of this invention mounted on a tree.

Throughout the following detailed description, the same reference numerals refer to the same elements in all figures.

The tree stand 10 is shown fully extended in FIG. 1 and in a partially collapsed mode in FIG. 4. The tree stand ladder 12 has a top tubular section 14, an intermediate tubular section 16 and a bottom tubular section 18. Cantilevered foot supports or hand grips 20 are integral with each ladder section. It is preferred that upper foot supports 20 are on each side of the ladder section in line whereas the lower grips 20 are staggered from side to side on the ladder sections. The surface of the grips 20 are roughened to provide for good traction.

Each ladder section is pivotably joined to an adjacent ladder section by an elbow attached to a spacer 32. In this manner elbow 22 is pivotably attached to elbow 24 and elbow 26 is pivotably attached to elbow 28 with spacers 32. The elbow 30 at the top of ladder section 14 is pivotably attached to bracket 34 which is welded to the bottom surface 36 of platform 38.

The ladder elbows 22, 28 and 30 are permanently attached to spacer 32 and bracket 34 with permanently mounted pins 40. Pins 42 in elbows 24 and 26 are merely flared at their ends and can be tapped out to add a second intermediate section (not shown) to the ladder 12. In this manner the height of the ladder can be easily extended.

All elbows have cylindrical bodies 44 integral with the elbow. The bodies 44 have grooves 46 that are impregnated with glue to seat the elbow bodies inside the end of the tubular ladder section. Weight reduction holes 48 are drilled in each body 44.

Figure 5:
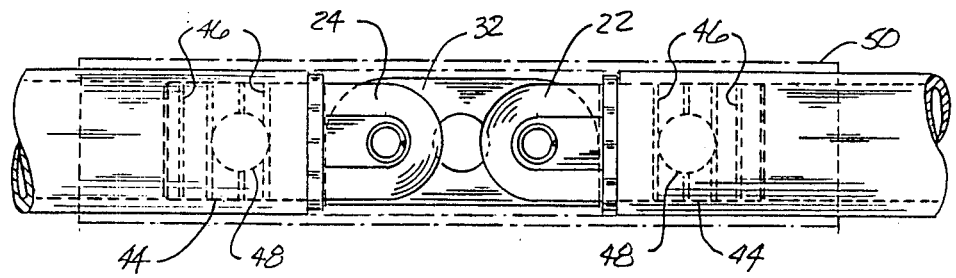
FIG. 5 is a side view of two aligned mounting sockets with the locking sleeve in phantom.
Figure 6:
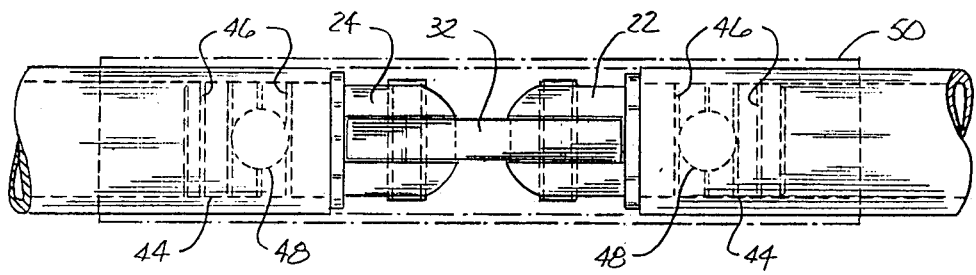
FIG. 6 is a top plan view of two matching mounting sockets with the locking sleeve in phantom.
Figure 7:
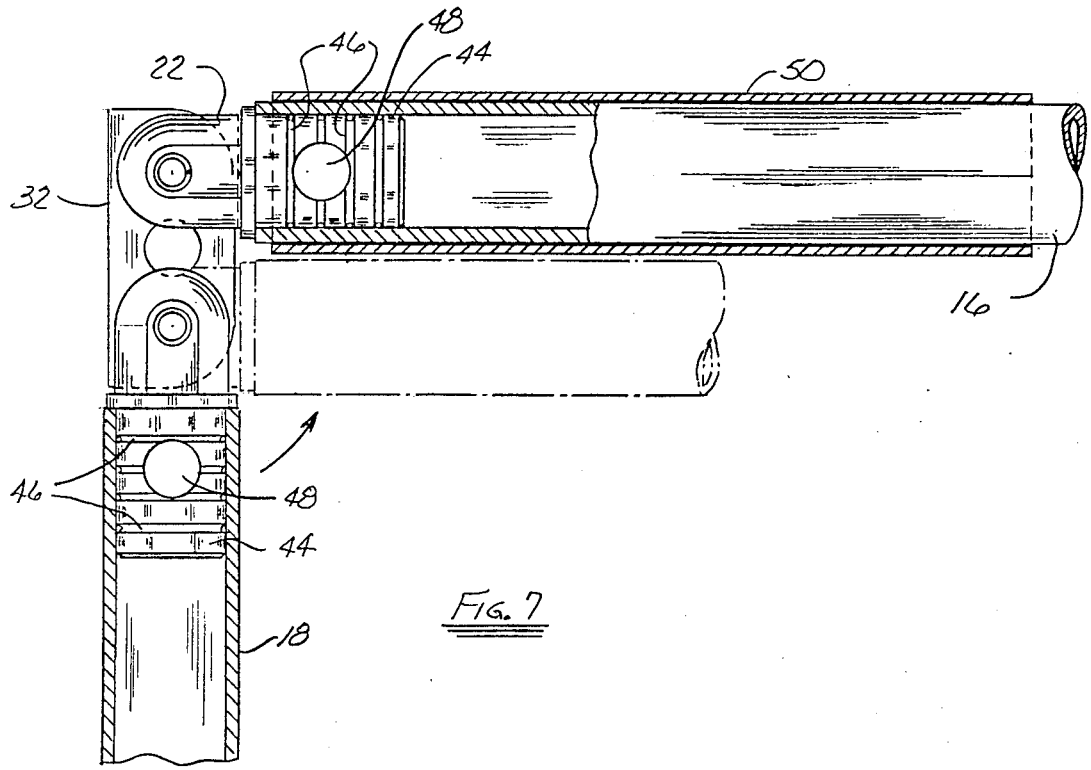
FIG. 7 is a side view of two mounting sockets unlocked at right angles with the storage position in phantom.
Figure 8:
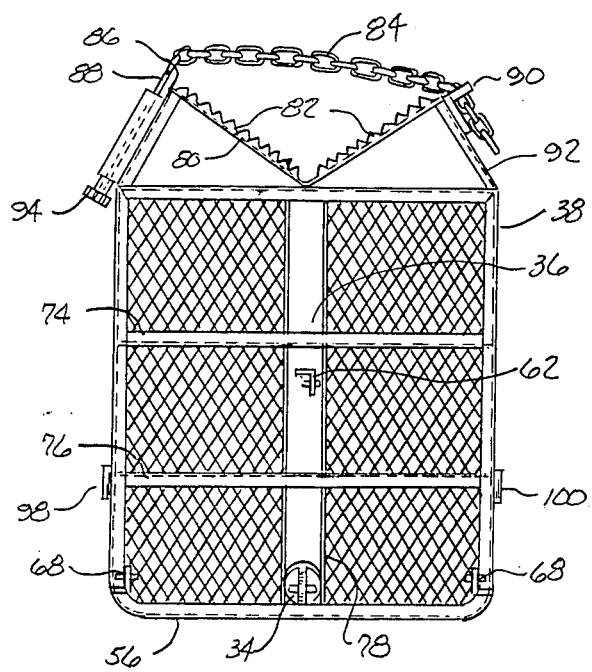
FIG. 8 is a bottom plan view of the platform showing the attachment elements.

Friction fitting sleeves 50 are carried around the outside of the tubular sections and are slipped over each pair of elbows to prevent movement of the elbows in their aligned mode as seen in FIGS. 1, 5 and 6.

A double strut supported base member 52 having two rows of teeth 54 for digging into the ground is permanently attached to the bottom of ladder section 18.

Platform 38 is connected at four points to ladder 12. In the first, elbow 30 is pivotably attached with pin 40 to bracket 34 welded to the lower surface 36 of platform 38. Bracket 34 is at an angle of eighty to eighty-four degrees to the front edge 56 of platform 38. This allows the ladder 12 to project outwardly from the platform and thus add stability to the ladder. The second connection is with hinged brace 58, attached at 60 to the ladder section 14 and at 62 to the lower surface 36 of platform 38. The other two connections are oppositely spaced hinged braces 64 and 66. Brackets 68 on each side of platform 38 attach the hinges 64 and 66 respectively to the platform 38. The other end of each brace 64 and 66 is hinged 70 and 72 respectively to the ladder 12.

The platform 38 has two transverse braces 74 and 76 and a longitudinal brace 78. The back edge 80 of the platform 38 is V-shaped with serrated edges 82 that are adapted to bite into the trunk of the tree. A chain 84 is permanently attached at a first side surface 86 to the end of a locking wheel screw 88. The chain 84 is pulled around the tree and then inserted into a link catch 90 on a second side surface 92 of platform 38. The wheel 94 is then turned to tighten the chain 84 around the tree.

A chair 96 is hinged at 98 and 100 to the right and left side respectively of platform 38. A rope 102 around the tree secures the chair 96.

The tree stand described when made from aluminum has a weight of about eighteen and one-half pounds. A carrying strap 104 allows the hunter to carry the stand 10 on his back. The collapsible mode of the tree stand has an elastomeric strap 106 attached between the ladder section 18 and the seat 96 to hold the collapsed stand together. In this mode the tree stand can be carried with a minimum of noise generated.

Figure 9:
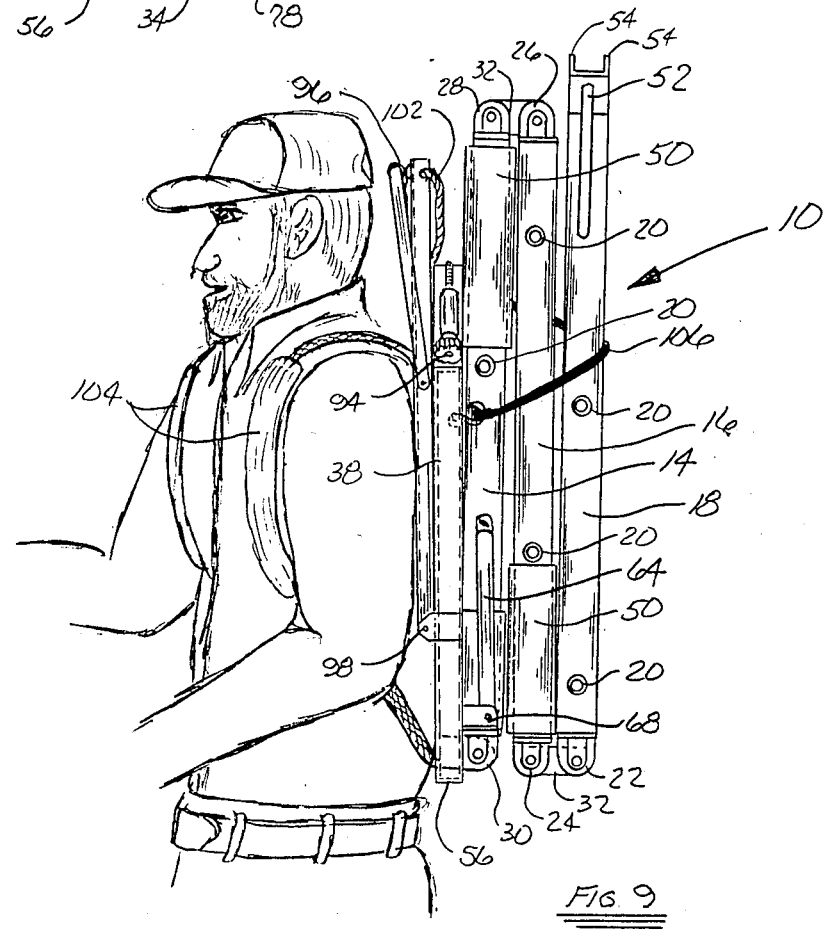
FIG. 9 is a perspective view of a person carrying the tree stand in its collapsed mode.

From the carrying pack shown in FIG. 9, the tree stand is erected by removing the strap 106 and placing the stand 10 on the ground near a selected tree. The three sections 14, 16 and 18 are raised toward the tree. The top sleeve 50 is slid down and locked over elbow 30. The brace 58 is then locked in place. The ladder 12 is then fully extended and the remaining sleeves 50 are slid over the elbows to straighten ladder 12. The chain 84 is released and the platform back edge 80 is engaged to the tree trunk. A securing cord (not shown) should be temporarily tied between the tree trunk and one of the hand grips 20 at eye level. The ladder 12 is then climbed and the chain 84 is secured around the tree and tightened with wheel 94. The seat 96 is then erected and the hunter is ready for an enjoyable day in his tree stand.

Having thus described the invention, what is claimed and desired to be secured by Letters Patent is:

1. A portable tree stand apparatus for positioning a person at an elevated position in a tree comprising:
    an elongated ladder having a cylindrical top, bottom and intermediate section, each section collapsible at connecting joints, each joint having a socket from each adjacent ladder section rotatably connected together;
    a braced supporting member attached to a distal end of the bottom section, the supporting member having a top and bottom surface, with the top surface attached to the bottom ladder section and the bottom surface of the supporting member having serrated edges for firm engagement with a top surface of soil surrounding the tree;
    multiple cantileveredly mounted hand and foot grips extending from each section;
    a platform pivotably attached at a front end to a distal end of the top section;
    each connection joint having a frictionally fit sleeve engaged over the connected sockets to prevent movement of the ladder in an erected position;
    the platform attached at a back edge to the trunk of a tree and held securely in place by a chain around the tree;
    the chain being tightened down around the tree by a locking wheel screw mounted on a side surface of the platform.

2. A portable tree stand apparatus according to claim 1 wherein each socket is integral with a cylindrical member that is permanently mounted within an end of a ladder section.

3. A portable tree stand apparatus according to claim 1 wherein the intermediate ladder section can be removed to add a second intermediate ladder section.

4. A portable tree stand apparatus according to claim 1 wherein the back edge of the platform is V-shaped and serrated.

5. A portable tree stand according to claim 1 collapsed into a compact carrying pack with each ladder section in parallel relation to each other and to the platform and each sleeve surrounds a ladder section adjacent a connecting joint.

* * * * *